United States Patent
Schmandt et al.

(10) Patent No.: US 7,031,995 B2
(45) Date of Patent: Apr. 18, 2006

(54) METHOD AND DEVICE FOR MODULO CALCULATION

(75) Inventors: Bernd Schmandt, Ratingen (DE); Michael Warmers, Erkelenz (DE)

(73) Assignee: Infineon Technologies AG, Munich (DE)

( * ) Notice: Subject to any disclaimer, the term of this patent is extended or adjusted under 35 U.S.C. 154(b) by 121 days.

(21) Appl. No.: 10/288,215

(22) Filed: Nov. 5, 2002

(65) Prior Publication Data

US 2003/0074382 A1 Apr. 17, 2003

Related U.S. Application Data

(63) Continuation of application No. PCT/DE01/01438, filed on Apr. 11, 2001.

(30) Foreign Application Priority Data

May 5, 2000 (DE) ................................ 100 21 920

(51) Int. Cl.
*G06F 7/38* (2006.01)
(52) U.S. Cl. .................................................... 708/491
(58) Field of Classification Search ........ 708/491–492; 380/28
See application file for complete search history.

(56) References Cited

U.S. PATENT DOCUMENTS

| 4,949,293 A | * | 8/1990 | Kawamura et al. | ......... 708/491 |
|---|---|---|---|---|
| 5,572,454 A | | 11/1996 | Lee et al. | |
| 6,415,310 B1 | * | 7/2002 | Takenaka et al. | ............ 708/491 |
| 2001/0010077 A1 | * | 7/2001 | McGregor et al. | ........... 713/174 |

FOREIGN PATENT DOCUMENTS

| DE | 689 24 386 T2 | 2/1990 |
| EP | 0 265 711 B1 | 5/1988 |
| EP | 0 308 963 A2 | 3/1989 |
| EP | 0 350 278 A2 | 1/1990 |
| EP | 0 356 153 B1 | 2/1990 |

\* cited by examiner

*Primary Examiner*—Tan V. Mai
(74) *Attorney, Agent, or Firm*—Laurence A. Greenberg; Werner H. Stemer; Ralph E. Locher

(57) ABSTRACT

In a data processing method, a remainder R that is produced during the division of an integer A by a prescribed integer B is calculated recursively. For this purpose, a data symbol word representing the integer A is decomposed into K data symbol part-words $W_0, W_1, \ldots, W_{K-1}$ of word length L, and in each recursion step a function F determined by the numbers B and L is applied to an argument that depends on the function value $F_{i-1}$ obtained in the preceding recursion step, and on a data symbol part-word $W_{K-i}$.

17 Claims, 3 Drawing Sheets

METHOD AND DEVICE FOR MODULO CALCULATION

CROSS-REFERENCE TO RELATED APPLICATION

This application is a continuation of copending International Application No. PCT/DE01/01438, filed Apr. 11, 2001, which designated the United States and was not published in English.

BACKGROUND OF THE INVENTION

Field of the Invention

The invention relates to a data processing method and a data processing device for carrying out a modulo calculation.

The calculation of a remainder R that is produced during the division of an integer A by an integer B plays an important role in the most varied fields of information and communication technology. The operation for determining the remainder R is designated as a modulo operation and is specified by the mathematical expression R=A mod B.

A specific field of application in which modulo operations are carried out in large numbers relates to the frequency hopping method that is used in radio signal data transmission. In the frequency hopping method, a data unit (data packet, data frame, etc.) is assigned a specific transmit frequency that is a selected from a list of possible transmit frequencies. The number of the possible transmit frequencies is prescribed by a standard. The allocation rule is implemented by a modulo operation, A being a number calculated on the basis of suitable parameters, and B being the total number of the available transmit frequencies.

Modulo operations are also frequently used in other fields of data processing such as, for example, the encoding and decoding of information (cryptography).

Modulo operations with reference to $B=2^n$, being an integer $\geq 1$, can be undertaken by a simple shift register and a rightward shift of the binary coded numerical value of A by n places. The bit sequence pushed out of the shift register during the rightward shift is the remainder R in binary number notation. Modulo operations with reference to a number B that is not a power to the base 2 are more complicated to calculate. For example, this may require the use of a counter circuit or a computing algorithm for division of A by B that is favorable in terms of outlay.

It holds in general that the outlay for calculating the remainder R increases with an increase in the value range of A and a number size of B. The term "outlay" can mean in this case both a time outlay for the processing program in order to carry out the calculation, and a material or configuration outlay for implementing the circuit carrying out the calculation.

SUMMARY OF THE INVENTION

It is accordingly an object of the invention to provide a method and a device for modulo calculation that overcomes the above-mentioned disadvantages of the prior art methods and devices of this general type, which are favorable in terms of outlay. The data processing method or the data processing device is intended in this case likewise to be capable of use for software-based as well as hardware-based computations, and to be suitable, in particular, for large value ranges of an integer A and large numerical values of a prescribed number B.

With the foregoing and other objects in view there is provided, in accordance with the invention, a data processing method for calculating a remainder R that results from a division of an integer A by a prescribed integer B. The method includes representing the integer A using a data symbol word, decomposing the data symbol word into a plurality of data symbol part-words each having an identical word length L, and performing a recursion step by applying a function dependent on the prescribed number B and the word length L to an argument dependent on a function value obtained in a preceding recursion step, and on a respective data symbol part-word assigned to the recursion step considered.

An essential point of view of the invention relates in that to calculate the remainder R use is made of a recursion method that is based on the fact that a constant computing rule (function) is applied repeatedly to an expression that is produced from the result of the last application of the calculating rule and, in each case, a specific part-word of the data symbol total word representing the number A. By decomposing the modulo calculation into repeated applications of the same calculating rule, the complexity of the calculating rule as such can be kept low. This permits the calculating rule to be executed by a simple algorithm or the implementation of a simply configured hardware circuit for executing the calculating rule.

In accordance with an advantageous exemplary embodiment of the invention, the values of the function are read out from a single table memory in the case of each recursion step.

It is necessary in this case to use a table memory covering the entire value range of the argument of the function.

Another possibility consists in providing a plurality of table memories, the function values to be determined in a specific recursion step being read out in each case only from a specific table memory assigned to the recursion step. The fact is utilized in that mode of procedure that the argument of the function in the first recursion steps can assume a smaller number of values than in the case of later recursion steps (the number of the values remains limited even in the case of the latter).

The data processing device according to the invention can contain a microcomputer that is configured for processing a data processing program representing the method according to the invention. Another advantageous refinement of the invention is characterized in that the data processing device is configured in a form of a hardware circuit in which a function value determining unit, an adder and a time-delay stage are disposed in a circuit loop.

Other features which are considered as characteristic for the invention are set forth in the appended claims.

Although the invention is illustrated and described herein as embodied in a method and a device for modulo calculation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

A positive integer A can be specified in a number notation to a base p as:

$$A = a_{N-1} \cdot p^{N-1} + a_{N-2} \cdot p^{N-2} + \ldots + a_1 \cdot p^1 + a_0 \cdot p^0.$$

Here, p denotes a positive integer, N denotes a number of places of the number A in the relevant number notation (N is denoted below as word length), and the coefficients $a_{N-1}$, $a_{N-2}, \ldots, a_0$ represent the numerals or data symbols of the number A.

A dual code notation (p=2) is selected below for explanation purposes. The data symbols $a_0, a_1, \ldots, a_{N-1}$ are bits in this case. The invention also contains, however, the case $p \neq 2$, in which the number A is represented in general by p-stage data symbols.

The dual code notation of the number A with a word length N is decomposed into part-words of a prescribed, identical word length L. A number K of the part-words $W_0$, $W_1, \ldots, W_{K-1}$ is governed by the word lengths N and L. If the number A has, for example, a word length of N=16 bits, and if L=4 is selected, the decomposition of the data symbol word for the number A contains four data symbol part-words, specifically:

$W_0 = a_3, a_2, a_1, a_0$
$W_1 = a_7, a_6, a_5, a_4$
$W_2 = a_{11}, a_{10}, a_9, a_8$
$W_3 = a_{15}, a_{14}, a_{13}, a_{12}$

The part-word $W_0$ has a significance of $2^{0 \cdot 4}$, the part-word $W_1$ has a significance of $2^{1 \cdot 4}$, the part-word $W_2$ has a significance of $2^{2 \cdot 4}$, and the significance of the part-word $W_3$ is $2^{3 \cdot 4}$ (the general expression for the significance for the qth part-word in a number notation to the base p is $p^{q \cdot L}$).

The value (independent of notation) of the individual part-words is also denoted below by $W_0$, $W_1$, $W_2$, $W_3$.

The implementation of the modulo calculation according to the invention uses the following mathematical identity:

$$\begin{aligned} A \bmod B &= (W_3 \cdot 2^{3 \cdot 4} + W_2 \cdot 2^{2 \cdot 4} + W_1 \cdot 2^{1 \cdot 4} + W_0 \cdot 2^{0 \cdot 4}) \bmod B \\ &= (((W_3 \cdot 2^4 + W_2) \cdot 2^4 + W_1) \cdot 2^4 + W_0) \bmod B \\ &= C \bmod B \end{aligned}$$

where $C = ((W_3 \cdot 2^4 \bmod B + W_2) \cdot 2^4 \bmod B + W_1) \cdot 2^4 \bmod B + W_0$, as well as the fact that this expression can be calculated recursively in a way that is favorable in terms of outlay. A function $$F(X) = X \cdot 2^4 \bmod B$$

is defined for this purpose, X, the argument of the function F, being a positive integer.

It is easy to see that the function F may be specified in the general case in the form of $$F(X) = X \cdot p^L \bmod B.$$

That is to say, for a prescribed number notation (base p) the function F is determined by the word length L of the data symbol part-words and by the number B.

Figure 1:
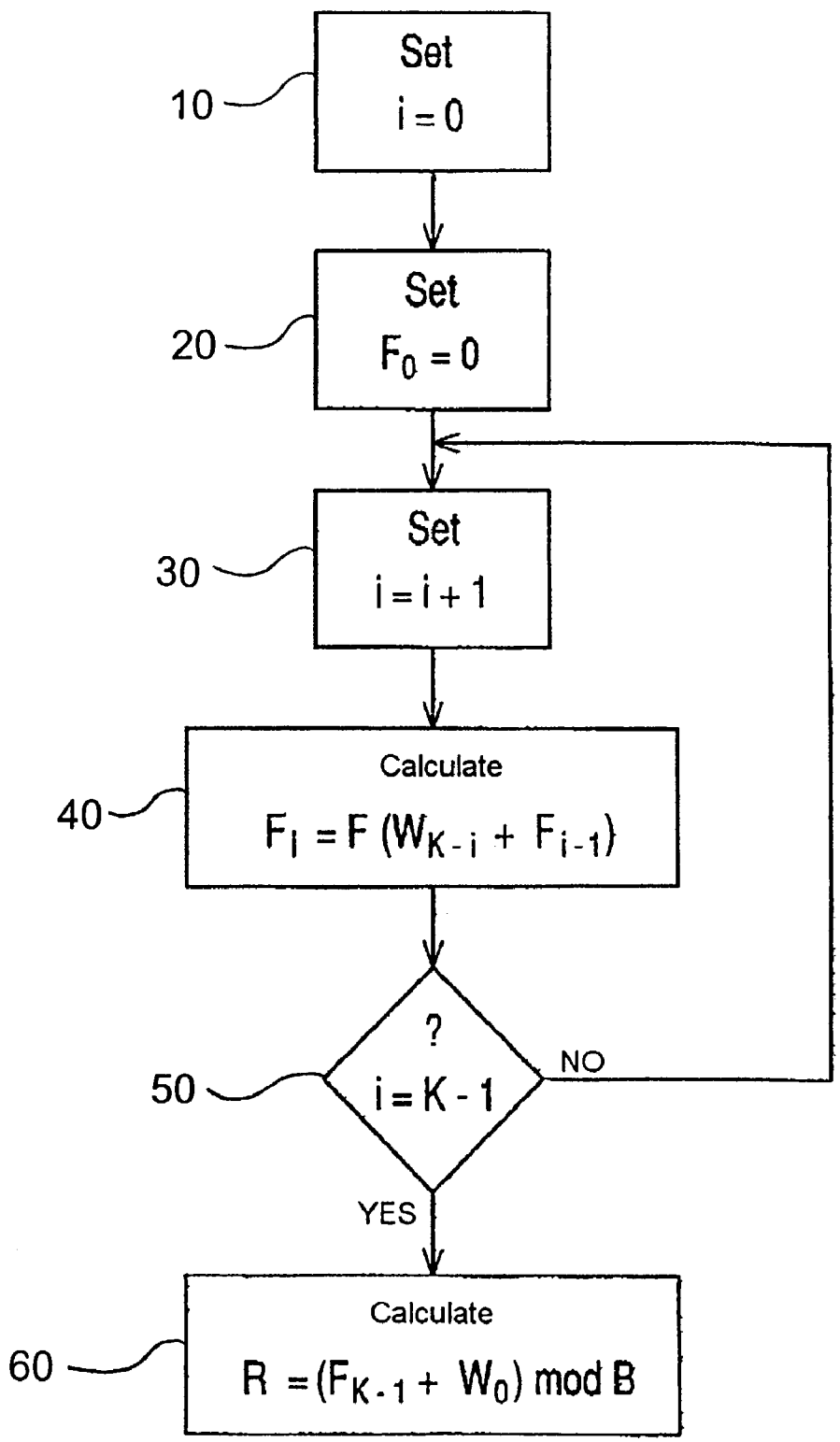
FIG. 1 is a simplified flowchart for explaining a method according to the invention.

The recursion according to the invention for the purpose of calculating the expression A mod B is explained with the aid of the flowchart illustrated in FIG. 1.

Conventional initialization steps of a data processing device for processing a data processing program illustrated by the flowchart, as well as input steps for the numbers A and B are omitted in the flowchart.

A first step 10 is to set the recursion loop index i to the value 0, and a function value $F_0=0$ of the zeroth recursion step is prescribed by definition, step 20.

A recursion loop begins by increasing the loop index i by the value 1, that is to say i=1 in the first loop pass (first recursion step 30).

The function value denoted by $F_i$ relating to the ith recursion loop pass is calculated in general according to the expression $$F_i = F(W_{K-i} + F_{i-1})$$

in a recursion calculating step 40.

For the example considered with K=4, the expression $F_1 = F(W_3)$ results in the first loop pass (i=1). Since $W_3$ can (just like the other part-words $W_0$, $W_1$, $W_2$) assume only 16 different values (specifically 0 to 15) for L=4, the function F can also assume only at most 16 different function values $F_1$ in the first loop pass.

A check is made in a next step 50 as to whether the condition i=K−1 is fulfilled. If this is not the case, the recursion loop is passed through afresh.

Consequently, in the example (K=4) considered the computing cycle goes over into the second recursion loop pass. The first step is to increment the loop index i, that is to say i=2 is set. In the following recursion calculating step, the function value $F_2$ of the second loop pass is calculated according to the relationship already specified, that is to say in accordance with $$F_2 = F(W_2 + F_1)$$

for K=4.

The recursive function calculation is continued according to this scheme until the condition i=K−1 (that is to say i=3 in the present example) is fulfilled. In this case, the program branches into a final calculating step 60 that is executed only once. The remainder R is calculated in accordance with $$R = (F_{K-1} + W_0) \bmod B$$

in the final calculating step. This corresponds to the calculation $R = (F_3 + W_0) \bmod B$ in the example considered.

Figures 2, 3:
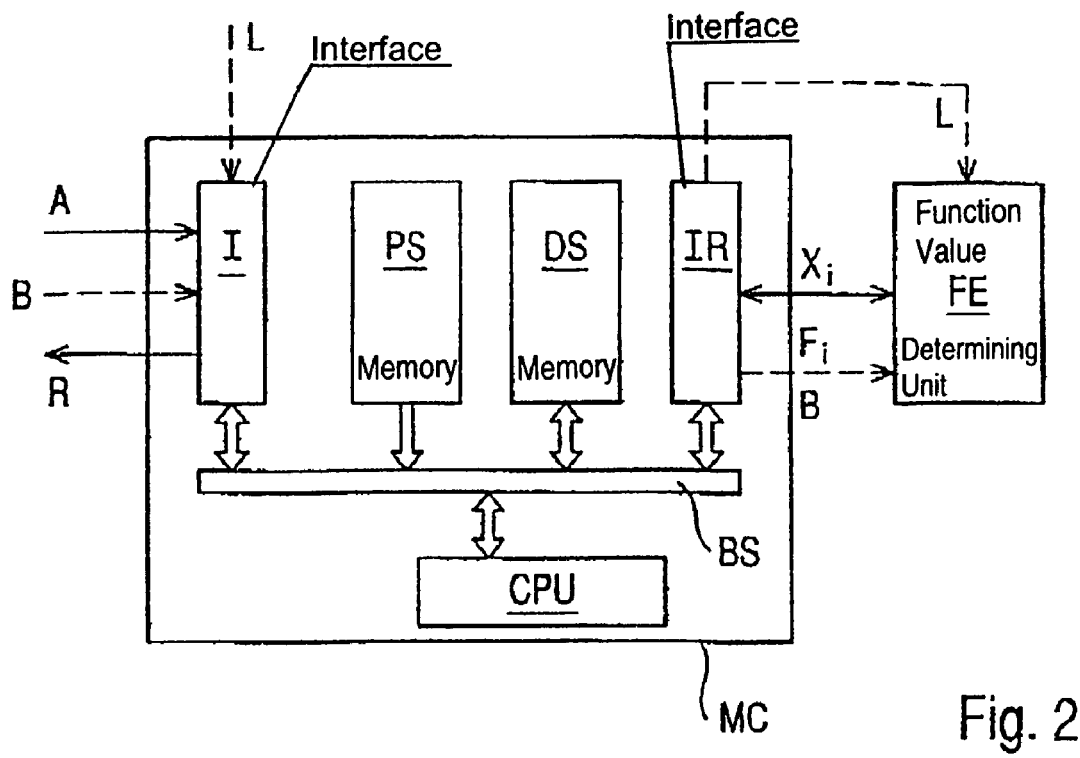
FIG. 2 is a circuit block diagram of a data processing device according to the invention with a microcomputer.
FIG. 3 is a schematic illustration of an address value range of a table memory for the purpose of explaining a function value determining unit shown in FIG. 2.

FIG. 2 shows in an exemplary fashion the configuration of a first data processing device according to the invention. The data processing device contains a processor CPU that is connected for the purpose of data exchange to a program memory PS and a data memory DS via a bus system BS. An input/output interface I and a further interface IR are also provided for the purpose of exchanging data with a periphery. The latter interface IR is connected for the purpose of data exchange to a function value determining unit FE. The units CPU, PS, DS, I, IR can be implemented in the form of a microcomputer MC.

The mode of operation of the data processing device illustrated is as now described. The integer A is communicated to the data processing device via the input/output interface I. If the device for modulo calculation is configured with reference to a variable number B, the integer B is also communicated to the device via the input/output interface I. As an option, it is also possible to vary the normally permanently preset word length L via the input/output interface I. The number A and, if appropriate, the numbers B and/or L are stored in the data memory DS.

Implemented in the program memory PS is a sequential program that essentially converts the algorithm illustrated in FIG. 1. Before the start of the sequential program, the first step is to use the number A received and the word length L of the data symbol part-words to determine the number of loop passes K. It corresponds to the number of the data symbol part-words that are required to represent the number A.

During the processing of the sequential program in accordance with FIG. 1, the data symbol part-word presently required in the current recursion loop pass is read out from the data memory DS, and intermediate results of the calculation, in particular the function value $F_i$ obtained in the current recursion loop pass) is stored in the data memory DS.

In each loop pass, the current argument $X_i = W_{K-i} + F_{i-1}$, denoted by $X_i$, of the function F is calculated by the microprocessor CPU, and communicated to the function value determining unit FE via the further interface IR. If the function value determining unit FE is configured to determine function values for different numbers B and, if appropriate, L, the numbers B and L must also be known to the unit FE before the acceptance of a first argument $X_1$.

The function value determining unit FE determines the function value $F_i$ in each loop pass and communicates the same to the microcomputer MC.

The function value determining unit FE can be implemented in various ways. For example, it is conceivable for it to be configured as a simple logic computing circuit. In accordance with a particularly preferred possibility, the function value determining unit FE is configured, however, as a table memory in which values of the function F with reference to the numbers B and L are stored.

If B and L are permanently prescribed, the content of such a table memory is likewise predetermined, that is to say the table memory can be configured as a read-only memory ROM.

If B and/or L are/is not permanently prescribed, there is either the possibility of using a plurality of table read-only memories (ROMs), or of using a memory with variable memory content (for example RAM or EEPROM) as table memory. In the first case, a single table read-only memory (ROM) must be used for each possible combination of a value pair (B, L), while in the second case the table memory is to be programmed in accordance with the prescribed values B and L before the start of the recursion calculation. The programming can be carried out in the form of an initialization step by the microcomputer MC, which for this purpose calculates the values of the function F and writes them into the table memory.

A modulo-79 operation (that is to say B=79) is considered below, by way of example. For example, a modulo-79 operation and a modulo-23 operation are agreed in the Bluetooth Standard for cordless telephony for the purpose of frequency allocation in a frequency hopping method. FIG. 3 illustrates the maximum value range for the argument X that can occur on the basis of the recursive application of the function. The maximum value range for the argument X (which corresponds in the case of the use of a table memory for the function value determining unit FE to the address value range of the table memory) extends from 0 to 93 in the case of the modulo-79 operation. This is to be ascribed to the fact that the function value $F_{i-1}$ calculated in the preceding recursion loop pass is always $\leq 78$ in accordance with the definition of the function F, and that the value of $W_{K-i}$ to be added to $F_{i-1}$ always contains the value range of 0 to 15 for all i.

Therefore, at most 94 different function values can occur, that is to say at most 94 memory locations are required.

The general result is a maximum value range of X between the values 0 and $B+p^L-1$.

The maximum value range of the argument X is not, however, necessarily exhausted in the case of the individual recursion passes. As already mentioned, for i=1 the argument $X_1$ can assume only the values 0 to 15 marked in FIG. 3 by a bold border. That is to say, a table memory with a storage capacity of 16 memory locations on which the associated function values are stored suffices for the first recursion pass i=1.

The argument $X_2$ is also incapable of assuming all values between 0 and 93 in the second recursion pass.

The possible values $F_1$ that the function F can assume in the first recursion step are emphasized by hatching in FIG. 3 in order to explain this state of affairs. These are the values 0 to 3, 16 to 18, 32 to 34, 48 to 50 and 64 to 66. Since the argument $X_2$ is determined in the second recursion pass by the relationship $X_2 = W_2 + F_1$, the result is a value range between 0 and 81 for $X_2$. Therefore a table memory with a storage capacity of at most 81 memory locations suffices for the second recursion pass i=2.

The value range, occurring in the case of the following recursion passes, of the argument X can be determined in an analogous way.

It is therefore also possible to provide for at least a few of the recursion passes, for example for i=1, 2, a dedicated table memory that in each case contains only the function values relevant for the recursion pass considered.

Figure 4:
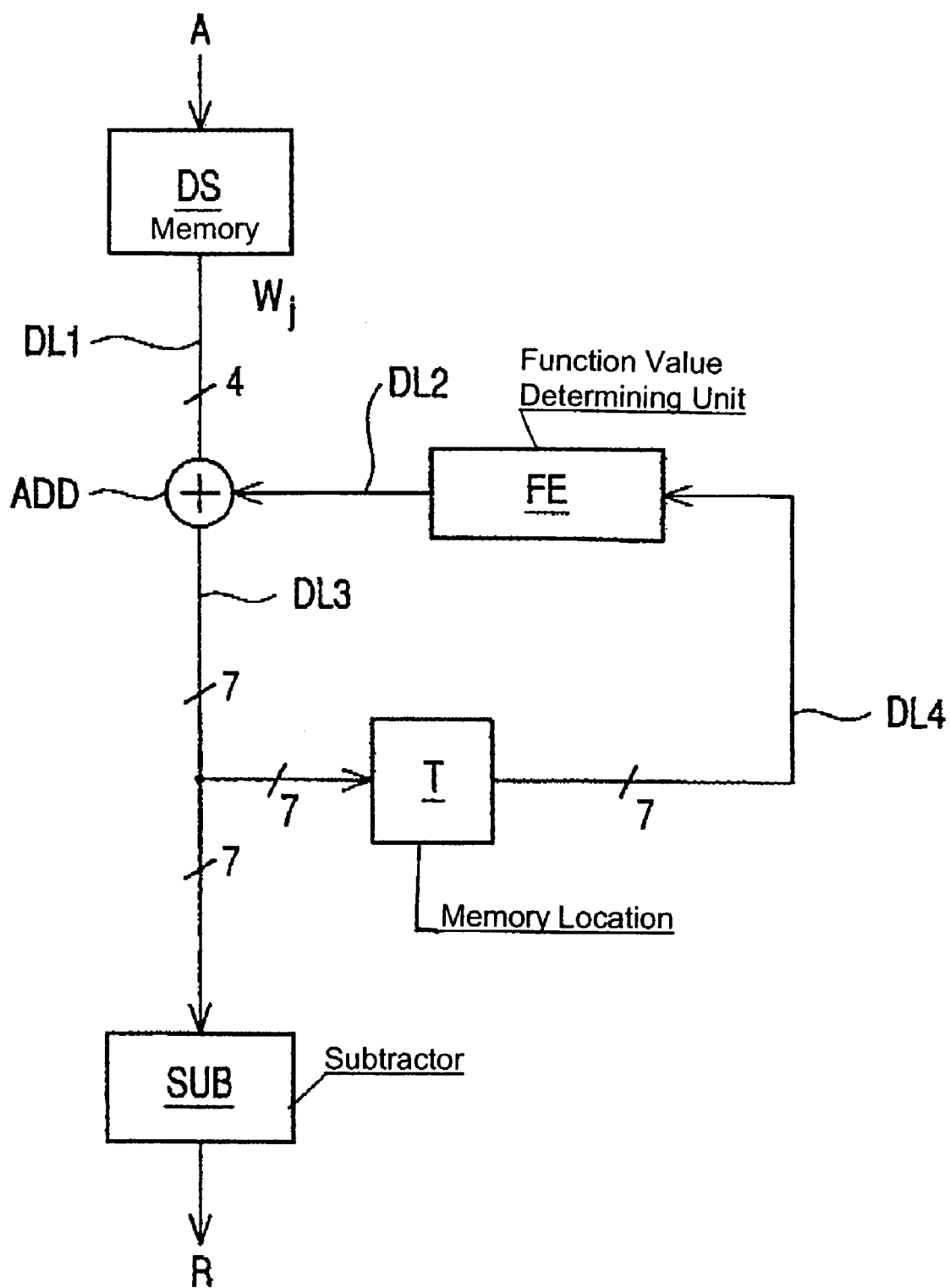
FIG. 4 is a block diagram of a further data processing device according to the invention in the form of a hardware circuit.

FIG. 4 shows a further data processing device according to the invention. The data processing device is implemented in the form of a digital hardware circuit that executes the modulo calculation without processing a program. Identical or comparable components to those in FIG. 2 are marked with the same reference symbols.

The hardware circuit contains the data memory DS, an adder ADD, a memory location T, the function value determining unit FE (preferably in the form of a read-only memory), and a subtractor SUB.

The circuit configuration corresponds to the algorithm explained in FIG. 1. It is considered below as an example of a number A that has a word length of N=25. The number A is then decomposed into K=7 data symbol part-words $W_j$, j=0 to K−1, of word length L=4, in the data memory DS.

Starting with the most significant part-word $W_6$, with each operating cycle a data symbol part-word $W_j$ is fed to the adder ADD via a data line DL1 of word length 4.

The adder ADD sums the currently fed data signal part-word $W_j$ with a function value that is provided by the function value determining unit FE via a data line DL2 of word length 7. The word length of 7 bits suffices, since the function value cannot become greater than 93.

The addition result output via a data line DL3 (word length likewise 7 bits) is first fed to the memory location T, delayed by the latter by one cycle and then supplied to the function value determining unit FE via a data line DL4 (word length 7 bits).

After 7 loop passes, a result with the value range from 0 to 93 is present at the output of the adder ADD.

In accordance with FIG. 1, this result still has to be subjected to the concluding modulo-79 operation. Since it holds for values F in the range from 79 to 93 that:

$$F \bmod 79 = F - 79,$$

the modulo operation can be reduced to a simple subtraction that is undertaken by the subtractor SUB. The remainder R is available at the output of the subtractor SUB.

The exemplary embodiments shown in FIGS. 2 and 4 can be combined in a suitable way. For example, the hardware circuit can also be configured a plurality of table memories, and/or be configured for modulo calculation with reference to a variable number B.

The data processing device according to the invention can be used, for example, to control the transmit frequency allocation in the frequency hopping method in a radio transmitter (for example for cordless telephony, mobile radio, etc.), the radio signal to be emitted being allocated a transmit frequency as a function of the remainder R calculated by the data processing device. If, as in the Bluetooth Standard, two modulo operations (modulo 79 and modulo 23) are used, the function value determining unit FE can be implemented in the simplest case by two read-only memories (read-only memory areas) that contain the corresponding function values.

We claim:

1. A data processing method for calculating a remainder R that results from a division of an integer A by a prescribed integer B, which comprises the steps of:
   representing the integer A using a data symbol word;
   decomposing the data symbol word into a plurality of data symbol part-words each having an identical word length L, the decomposition being pre-fixable before performing a recursion step; and
   performing the recursion step by applying a function dependent on the prescribed number B and the word length L to an argument which is the sum of a function value obtained in a preceding recursion step and a respective data symbol part-word assigned to the recursion step considered.

2. The method according to claim 1, which comprises reading out values of the function from a table memory.

3. The method according to claim 2, wherein the table memory requires at most $B+p^L-1$ memory locations, p indicating a number of possible values for a data symbol.

4. The method according to claim 1, which comprises reading out values of the function from a plurality of table memories, and in that a specific one of the table memories is assigned to a specific recursion step.

5. The method according to claim 1, which comprises performing a sequencing control for recursive application of the function using a microcomputer.

6. The method according to claim 1, which comprises using a hardware circuit to carry out the data processing method.

7. The method according to claim 1, wherein in a course of a frequency hopping method a radio signal to be emitted is allotted a transmit frequency as a function on a calculated number being the remainder R.

8. A data processing device, comprising:
   a circuit configured to:
      calculate a remainder R that results during division of an integer A by a prescribed integer B, a starting point being a representation of the integer A by a data symbol word;
      decompose the data symbol word into a plurality of data symbol part-words each having an identical word length L, the decomposition being pre-fixable before performing a recursion step; and
      apply a function dependent on the prescribed number B and the word length L to an argument in a recursion step, the argument being the sum of a function value obtained in a preceding recursion step and a respective data symbol part-word assigned to the recursion step considered.

9. The data processing device according to claim 8, wherein said circuit has a function value determining unit with an input for accepting the argument, and an output for providing the function value determined during application of the function to the argument.

10. The data processing device according to claim 9, wherein said function value determination unit is configured for calculating values of a plurality of different functions and contains a plurality of table memories, a respective one of said table memories being assigned to a specific function.

11. The data processing device according to claim 10, wherein said circuit includes a microcomputer connected to and exchanging data with said function value determining device.

12. The data processing device according to claim 10, wherein said circuit contains a hardware circuit having said function value determining unit, an adder and a time-delay stage all disposed in a circuit loop.

13. The data processing device according to claim 10, wherein said function value determining device is programmable with reference to different values of at least one of the prescribed integer B and the word length L.

14. The data processing device according to claim 10, wherein said table memories containing specific value pairs of the prescribed integer B and the word length L.

15. The data processing device according to claim 10, wherein specific value pairs of the prescribed integer B and the word length L are assigned to said table memories.

16. The data processing device according to claim 9, wherein said function value determining unit contains a plurality of table memories, and a specific one of said table memories being assigned to at least one specific recursion step.

17. A device for controlling a transmit frequency allocation during a frequency hopping method in a radio transmitter, the device comprising:
   a data processing unit configured to:
      calculate a remainder R that results during division of an integer A by a prescribed integer B, a starting point being a representation of the integer A by a data symbol word;
      decompose the data symbol word into a plurality of data symbol part-words each having an identical word length L, the decomposition being pre-fixable before performing a recursion step; and apply a function dependent on the prescribed number B and the word length L to an argument in the recursion step, the argument being the sum of a function value obtained in a preceding recursion step and a respective data symbol part-word assigned to the recursion step considered, the device allocating a transmit frequency to a radio signal to be emitted in dependence on the remainder R calculated by said data processing device.

* * * * *